M. CRAIGHEAD.
BRAKE AND FRICTION MEMBER.
APPLICATION FILED MAR. 24, 1920.
1,405,103.
Patented Jan. 31, 1922.
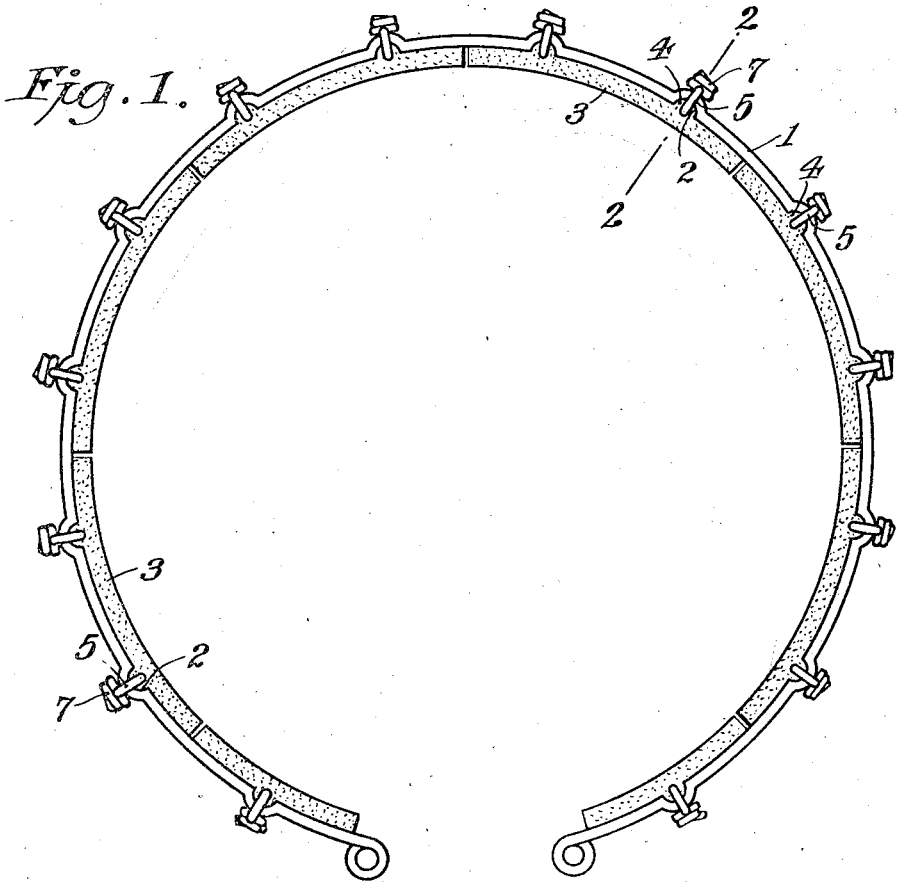
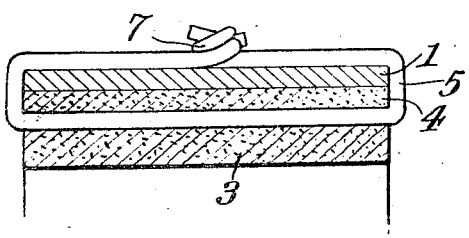
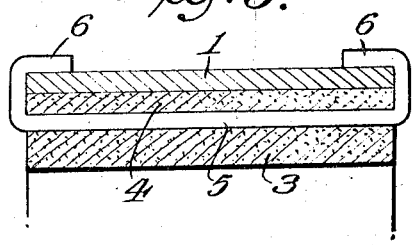

UNITED STATES PATENT OFFICE.

MAGRUDER CRAIGHEAD, OF HARTSDALE, NEW YORK, ASSIGNOR TO JOHNS-MANVILLE INCORPORATED, A CORPORATION OF NEW YORK.

BRAKE AND FRICTION MEMBER.

1,405,103. Specification of Letters Patent. Patented Jan. 31, 1922.

Application filed March 24, 1920. Serial No. 368,254.

*To all whom it may concern:*

Be it known that I, MAGRUDER CRAIGHEAD, a citizen of the United States of America, residing at Hartsdale, county of Westchester, State of New York, have invented certain new and useful Improvements in Brakes and Friction Members, of which the following is a specification.

My invention relates to brake bands and similar friction members in general but is particularly designed to afford a structure for automobile brakes in which the lining for the brake band can be conveniently removed and replaced without taking off the wheel of the automobile or otherwise disassembling the brake elements. The best form of apparatus embodying my invention at present known to me is illustrated in the accompanying sheet of drawings in which—

Fig. 1 is a side elevation of a brake band and lining therefor made in accordance with my invention;

Fig. 2 is a cross section on a large scale on line 2—2 of Figure 1, and

Fig. 3 is a similar cross section illustrating a modification.

Throughout the drawings like reference characters indicate like parts. 1, is the usual metal band or strip which surrounds the brake drum and has its ends drawn together to apply the friction, and pushed apart to release the friction. This strip is preferably forged or rolled, as shown with a series of recesses 2, 2, formed in its inner face. These recesses extend across the band face and are preferably of substantially uniform cross section throughout. The strip 1 should have at least one edge free from any overhanging ledge or other projection radial to the arc to which the strip is bent so that any desired facing member can be inserted between the strip and the brake drum when the brakes are in released position by simply slipping such facing strip in under the strip 1 from one side thereof, the movement of the so inserted element being parallel to the axis of the brake drum. 3, 3, are sections of lining for the brake band usually composed of some friction producing material such as an asbestos mass or composition and these sections each have a face on one side curved to an arc of a circle having the same center as the brake drum and are provided on the other face with projections 4, 4, extending radially of the said arc and adapted to fit into the recesses 2, 2, in the brake band and thereby prevent circumferential sliding of the brake liner sections on the brake band. The lining sections being thus confined between the brake drum, not shown, and the brake band, cannot slide circumferentially on the brake band no matter how great the strain of the braking action. When the brake band is released from the tension, however, these lining sections can be easily slid in or out of position sideways for replacement purposes. To hold the lining in position relative to the band when the brake is not being applied, some light fastening means is employed such as wires or strips 5, 5, passing through transverse perforations in the liner sections, or molded or otherwise incorporated in place in the process of making the liner sections. These wires are twisted up around the outside of the brake band and may be tied or twisted together in a knot or twist 7, as shown in Fig. 2, or may be simply hooked over the edges of the brake band as shown in Fig. 3, at 6, 6. In use, whenever the brakes need relining the fastening wires 5, 5, are straightened out, or unfastened, the liner sections 3, 3, slid out sideways and fresh sections slid back into position and fastened to the brake band by the wires or strips as before. This avoids taking off the wheel of the motor car or otherwise disturbing the remaining elements of the brake construction.

Of course, the brake band and brake drum should be left free from flanges or other radial projections on the side from which the lining blocks are to be slipped in and out.

It is understood that each lining block may be made with a plurality of the projections 4, 4, and corresponding fastening wires or strips, 5, 5.

It is preferred to have the fastening wires run through the projections 4, 4, as this enables the lining blocks to be worn down without cutting through the fastening wires, but as far as fastening is concerned, it is not necessary that the wires run through the projections, but may be at any part of the blocks.

Having described my invention, I claim:

1. In a friction device the combination of a backing member having an inner, generally cylindrical face with one edge free from radial projections, but having a transverse recess of uniform cross section, a lining body fitting said inner face and having an integral projection engaging said recess, and means for fastening the backing and lining together.

2. A combination such as set forth in claim 1, in which the fastening means comprises a wire passing through a transverse perforation in the projection on the lining body, and having its ends passing around the edges of the backing member.

MAGRUDER CRAIGHEAD.

Witness:
B. C. McCLURE.